United States Patent
Kotake et al.

(10) Patent No.: US 12,498,133 B2
(45) Date of Patent: Dec. 16, 2025

(54) AIR-CONDITIONING SYSTEM, MANAGEMENT DEVICE, AIR CONDITIONER, SENSOR DATA ACQUISITION METHOD, AND RECORDING MEDIUM

(71) Applicant: Mitsubishi Electric Corporation, Tokyo (JP)

(72) Inventors: Hiroaki Kotake, Tokyo (JP); Hiroaki Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 339 days.

(21) Appl. No.: 17/785,135

(22) PCT Filed: Mar. 4, 2020

(86) PCT No.: PCT/JP2020/009277
§ 371 (c)(1),
(2) Date: Jun. 14, 2022

(87) PCT Pub. No.: WO2021/176624
PCT Pub. Date: Sep. 10, 2021

(65) Prior Publication Data
US 2023/0029584 A1    Feb. 2, 2023

(51) Int. Cl.
*F24F 11/63*    (2018.01)
*G05B 23/02*    (2006.01)

(52) U.S. Cl.
CPC .......... *F24F 11/63* (2018.01); *G05B 23/0286* (2013.01)

(58) Field of Classification Search
None
See application file for complete search history.

(56) References Cited

U.S. PATENT DOCUMENTS

| | | | |
|---|---|---|---|
| 2009/0222142 A1* | 9/2009 | Kao | G05B 15/02 700/291 |
| 2016/0261481 A1 | 9/2016 | Ogata et al. | |
| 2017/0284840 A1* | 10/2017 | Mino | G01D 21/02 |

FOREIGN PATENT DOCUMENTS

| | | |
|---|---|---|
| CN | 108317662 A | 7/2018 |
| JP | 2001-235217 A | 8/2001 |
| JP | 2006-338186 A | 12/2006 |
| JP | 2016-163242 A | 9/2016 |
| JP | 2017-053551 A | 3/2017 |

(Continued)

OTHER PUBLICATIONS

Machine Translation of WO2017033240 (Year: 2017).*

(Continued)

*Primary Examiner* — Ryan A Jarrett
(74) *Attorney, Agent, or Firm* — Posz Law Group, PLC

(57) ABSTRACT

A centralized management device includes a sensor data acquirer and an acquisition cycle changer. The sensor data acquirer acquires periodically, by communication, from each of one or more outdoor units, sensor data including measurement results of one or more sensors included by the outdoor unit. When a sign of malfunction is detected in any of the outdoor units, the acquisition cycle changer makes a change to shorten an acquisition cycle of the sensor data for the outdoor unit for which the sign of malfunction is detected.

7 Claims, 6 Drawing Sheets

(56) References Cited

FOREIGN PATENT DOCUMENTS

WO     WO-2017033240 A1 *    3/2017    ............. F25B 49/02
WO        2019/030896 A1     2/2019

OTHER PUBLICATIONS

Extended European Search Report, mailed May 2, 2023, for the corresponding EP Patent Application No. 20923514.2.
Office Action dated Apr. 18, 2023, issued for the corresponding JP Patent Application No. 2022-504862 (and English translation).
International Search Report of the International Searching Authority mailed Apr. 28, 2020 issued in the corresponding International Application No. PCT/JP2020/009277 (and English translation).

* cited by examiner

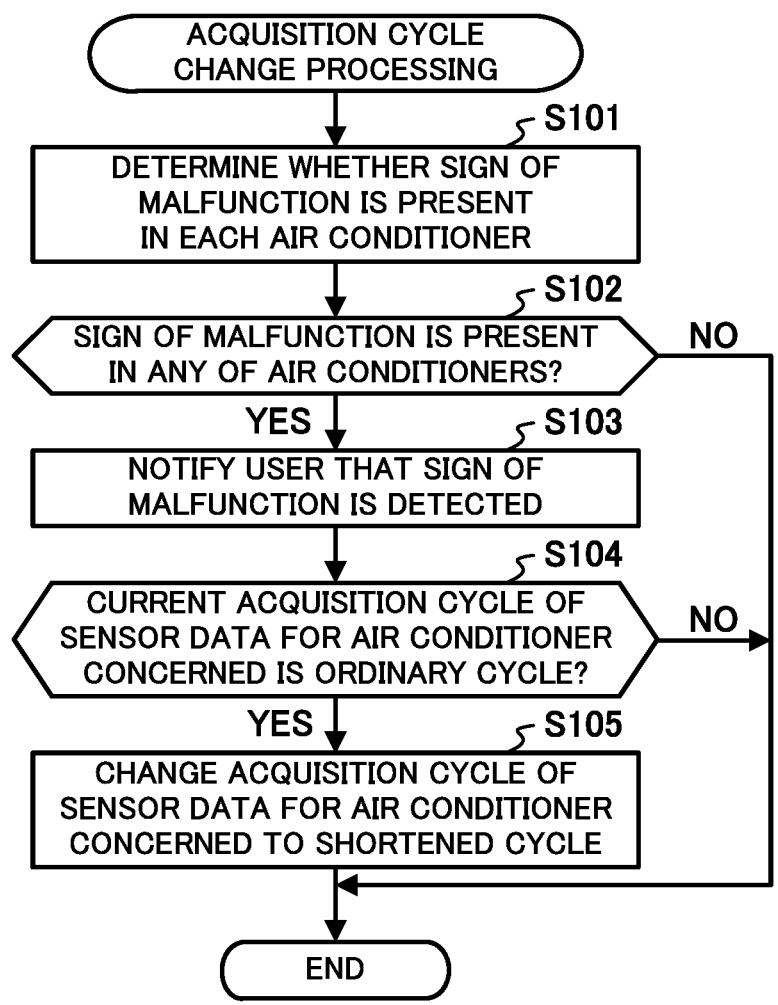

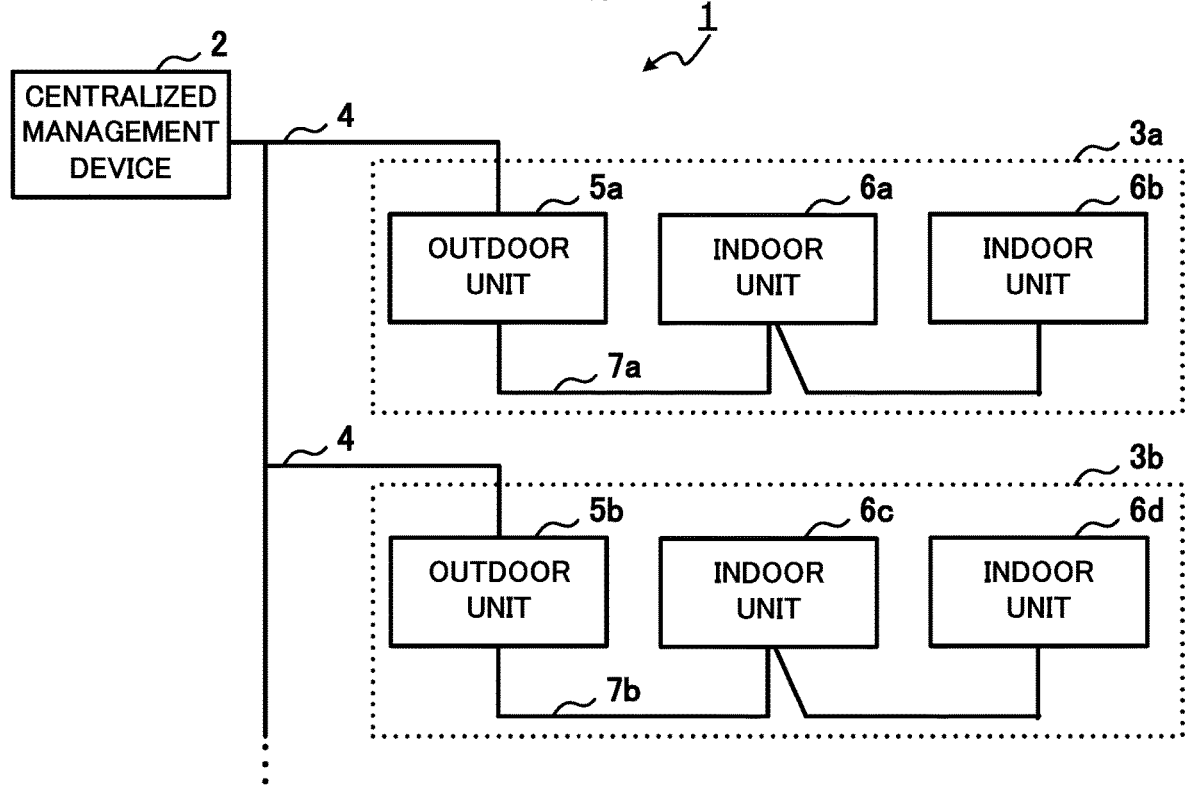
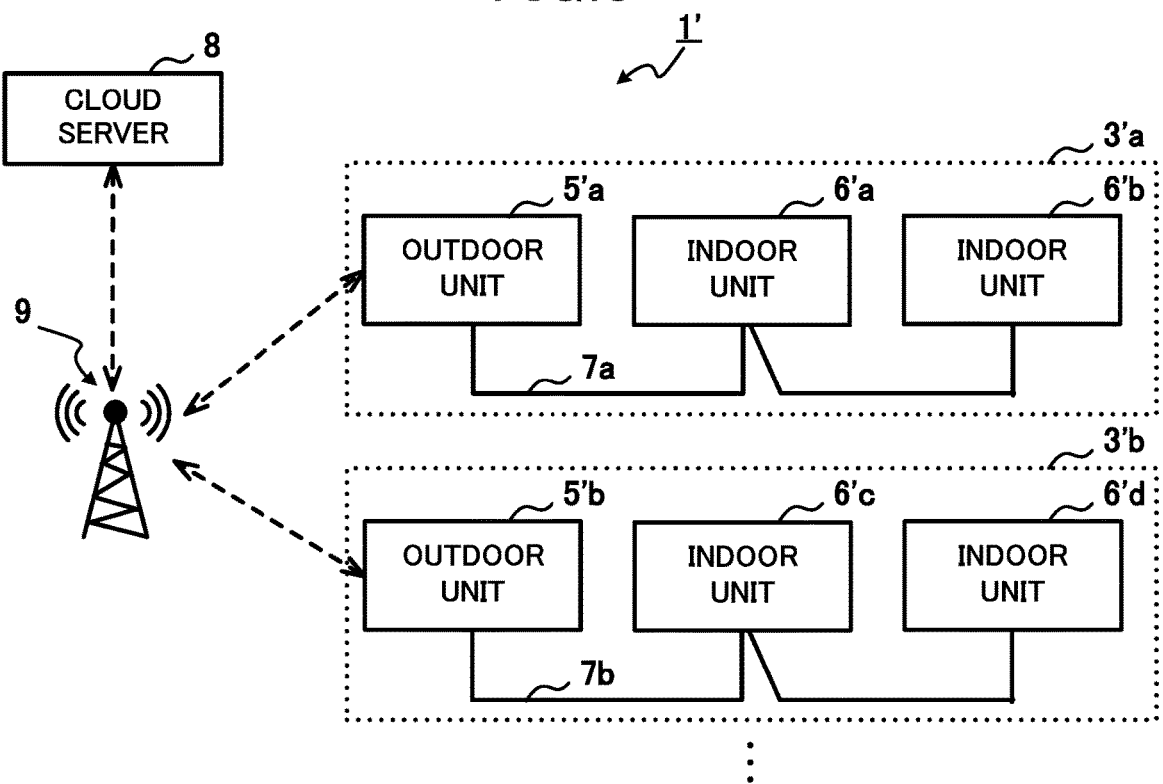

AIR-CONDITIONING SYSTEM, MANAGEMENT DEVICE, AIR CONDITIONER, SENSOR DATA ACQUISITION METHOD, AND RECORDING MEDIUM

CROSS REFERENCE TO RELATED APPLICATION

This application is a U.S. national stage application of International Patent Application No. PCT/JP2020/009277 filed on Mar. 4, 2020, the disclosure of which is incorporated herein by reference.

TECHNICAL FIELD

The present disclosure relates to an air-conditioning system, a management device, an air conditioner, a sensor data acquisition method, and a program.

BACKGROUND

In recent years, in a multi-type building air-conditioning system that includes a centralized management device, multiple outdoor units, and multiple indoor units, such as the air-conditioning system disclosed in Patent Literature 1, a service is known in which a centralized management device periodically acquires sensor data from each of outdoor units, analyzes each acquired sensor data, and detects, for each air conditioner that includes a corresponding outdoor unit, a sign of malfunction in the air conditioner. The sensor data is data storing a result of measurement by each of one or more sensors included in each outdoor unit.

PATENT LITERATURE

Patent Literature 1: International Publication No. WO 2019/030896

Enabling short-time-interval acquisition of the sensor data or enabling analysis by more enhanced sensor data having a high quality, such as sensor data obtained by wide types of sensors or having high resolution, is desirable to improve accuracy in detection of the sign of malfunction by the aforementioned service.

However, both acquiring the sensor data at short time intervals and acquiring enhanced sensor data have a problem of leading to an increase in traffic in communication between the centralized management device and each outdoor unit.

SUMMARY

The present disclosure is made to solve the aforementioned problems, and an objective of the present disclosure is to provide an air-conditioning system and the like that enable high-accuracy detection of the sign of malfunction while avoiding occurrence of an increase in communication traffic.

To achieve the aforementioned objective, an air-conditioning system according to the present disclosure includes a management device and one or more air conditioners. Each of the one or more air conditioners includes an outdoor unit and one or more indoor units. The management device includes (i) sensor data acquisition means for acquiring periodically, by communication, from each of the one or more air conditioners, sensor data including measurement results of one or more sensors included by the air conditioner and (ii) change means for making, when a sign of malfunction is detected in any of the one or more air conditioners, to the air conditioner for which the sign of malfunction is detected, at least one of a change to shorten an acquisition cycle of the sensor data or a change to enhance the sensor data to be acquired.

The present disclosure enables high-accuracy detection of the sign of malfunction while avoiding occurrence of an increase in communication traffic.

BRIEF DESCRIPTION OF DRAWINGS

FIG. 6 is a flowchart illustrating a process of acquisition cycle change processing executed by the centralized management device according to Embodiment 1;

FIG. 7 illustrates overall configuration of an air-conditioning system according to a modified example of Embodiment 1;

FIG. 8 illustrates overall configuration of an air-conditioning system according to Embodiment 2:

DETAILED DESCRIPTION

Hereinafter, embodiments of the present disclosure are described in detail with reference to the drawings.

Embodiment 1

Figure 1:
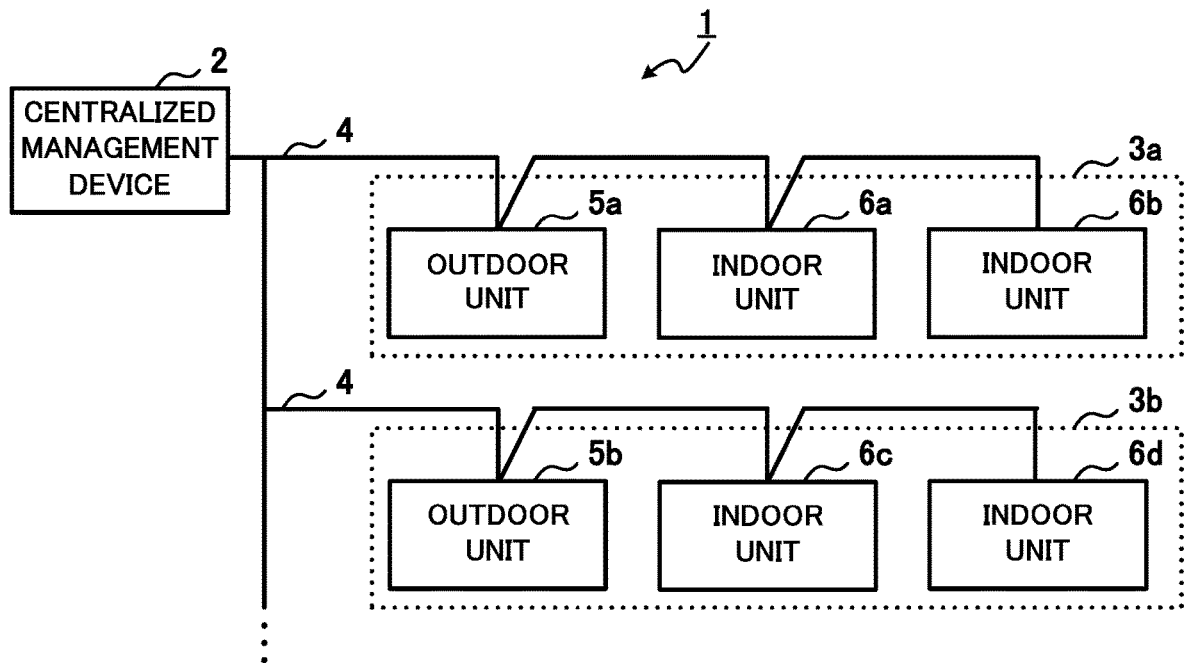
FIG. 1 illustrates overall configuration of an air-conditioning system according to Embodiment 1.

FIG. 1 illustrates overall configuration of an air-conditioning system 1 according to Embodiment 1. The air-conditioning system 1 is, for example, a multi-type building air-conditioning system for air conditioning of a building such as an office building, and includes a centralized management device 2 and air conditioners 3*a*, 3*b*, and the like.

Figure 2:
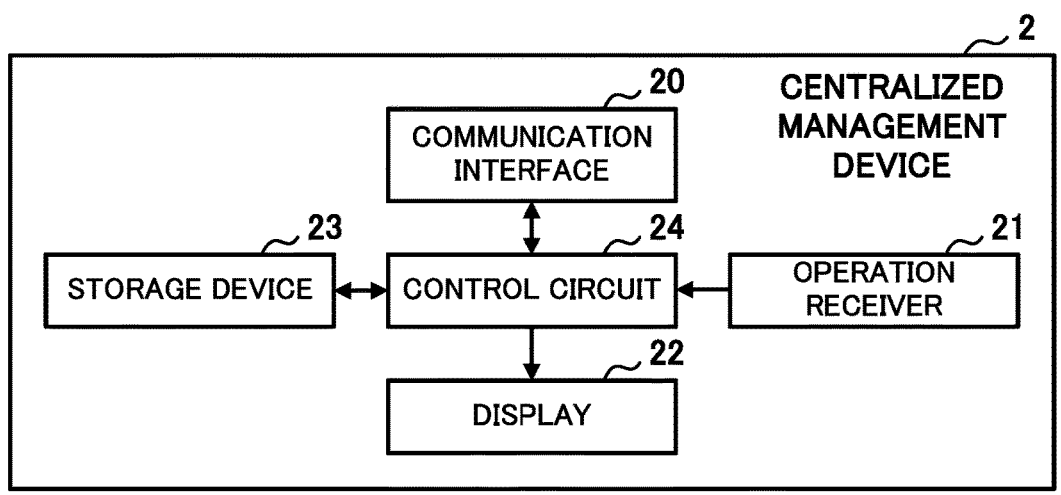
FIG. 2 is a block diagram illustrating hardware configuration of a centralized management device according to Embodiment 1.

The centralized management device 2 is an example of a management device, is a device for centrally managing the air conditioners 3*a*, 3*b*, and the like, and is arranged in a location allowing entry only by authorized personnel, such as a management room in the building. As illustrated in FIG. 2, the centralized management device 2 includes a communication interface 20, an operation receiver 21, a display 22, a storage device 23, and a control circuit 24.

The communication interface 20 is hardware for communication with the air conditioners 3*a*, 3*b*, and the like by a first communication method via a communication line 4. The first communication method is, for example, Ethernet®.

The operation receiver 21 includes one or more input devices, such as a keyboard, a mouse, a key pad, a push-button, a touch panel, and a touch pad, receives an input operation from a user, and sends to the control circuit 24 a signal according to the received input operation.

The display 22 includes a display device, such as a CRT display, a liquid crystal display, an organic EL display, and a plasma display. The display 22 displays, under control by the control circuit 24, a screen or the like for managing the air conditioners 3a, 3b, and the like.

The storage device 23 includes a readable/rewritable nonvolatile semiconductor memory such as an electrically erasable programmable read-only memory (EEPROM) and a flash memory, a hard disk drive (HDD), or the like. The storage device 23 stores a management program for management of the air conditioners 3a, 3b, and the like, and data for use in execution of such management program.

The control circuit 24 includes, for example, a central processing unit (CPU), a read only memory (ROM), and a random access memory (RAM), and performs overall control of the centralized management device 2. Functions of the centralized management device 2 that are achieved by the control circuit 24 are described later in detail.

Each of the air conditioners 3a, 3b, and the like includes one outdoor unit and one or more indoor units. For example, the air conditioner 3a includes an outdoor unit 5a, an indoor unit 6a, and an indoor unit 6b, and the air conditioner 3b includes an outdoor unit 5b, an indoor unit 6c, and an indoor unit 6d.

The outdoor unit 5a and the indoor units 6a and 6b are connected via non-illustrated refrigerant piping for circulation of refrigerant. That is to say, the outdoor unit 5a and the indoor units 6a and 6b are included in one refrigerant system. Further, each of the outdoor unit 5a and the indoor units 6a and 6b has bus connection to the communication line 4. Moreover, although not illustrated, the air conditioner 3a includes a dedicated remote controller for receiving an operation related to air conditioning from the user, and this dedicated remote controller also has bus connection to the communication line 4.

The outdoor unit 5b and the indoor units 6c and 6d are connected via refrigerant piping that is different from the refrigerant piping between the outdoor unit 5a and the indoor units 6a and 6b. That is to say, the outdoor unit 5b and the indoor units 6c and 6d are included in one refrigerant system. Further, each of the outdoor unit 5b and the indoor units 6c and 6d has bus connection to the communication line 4. Moreover, although not illustrated, the air conditioner 3b includes a dedicated remote controller for receiving an operation related to air conditioning from the user, and this dedicated remote controller also has bus connection to the communication line 4.

Hereinafter, in explanation of matters that are common between the outdoor units 5a and 5b, these outdoor units are referred to collectively as the outdoor units 5 without individual designation, and in explanation of matters that are common among the indoor units 6a-6d, these indoor units are referred to collectively as the indoor units 6 without individual designation.

Figure 3:
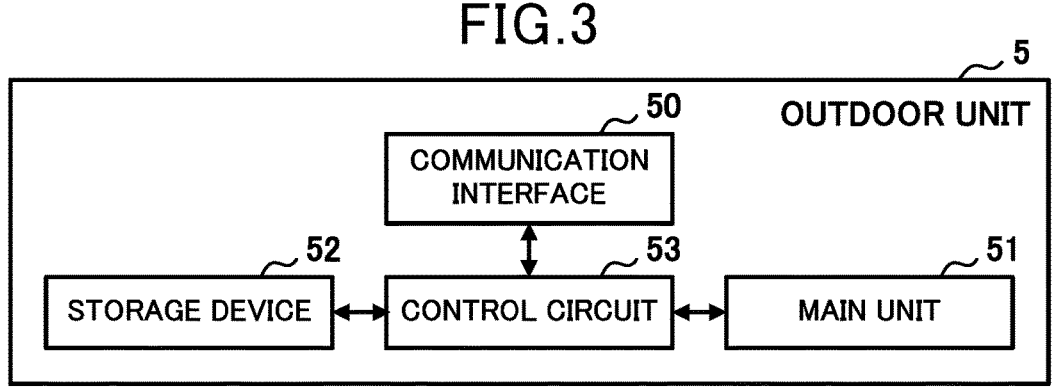
FIG. 3 is a block diagram illustrating hardware configuration of an outdoor unit according to Embodiment 1.

Each of the outdoor units 5 includes, as illustrated in FIG. 3, a communication interface 50, a main unit 51, a storage device 52, and a control circuit 53. The communication interface 50 is hardware for communication with another device by the first communication method via the communication line 4.

The main unit 51 is a component for achievement of fundamental functions of a general outdoor unit, and includes (i) a refrigerant circuit including a compressor, a heat exchanger, an expansion valve, and a four-way valve, and the like, (ii) a fan, (iii) various types of sensors such as a current sensor, a temperature sensor, a pressure sensor, a frequency sensor, an acceleration sensor, or the like.

The storage device 52 includes a readable/rewritable nonvolatile semiconductor memory, such as an EEPROM and a flash memory. The storage device 52 stores a program related to transmission of the sensor data and data for use in execution of this program. The storage device 52 stores, in addition to the above, various types of programs including a program related to operation control of the main unit 51 and data for use in execution of these programs.

The control circuit 53 includes, for example, a non-illustrated CPU, a non-illustrated ROM, and a non-illustrated RAM, and performs overall control of a corresponding outdoor unit 5.

Figure 4:
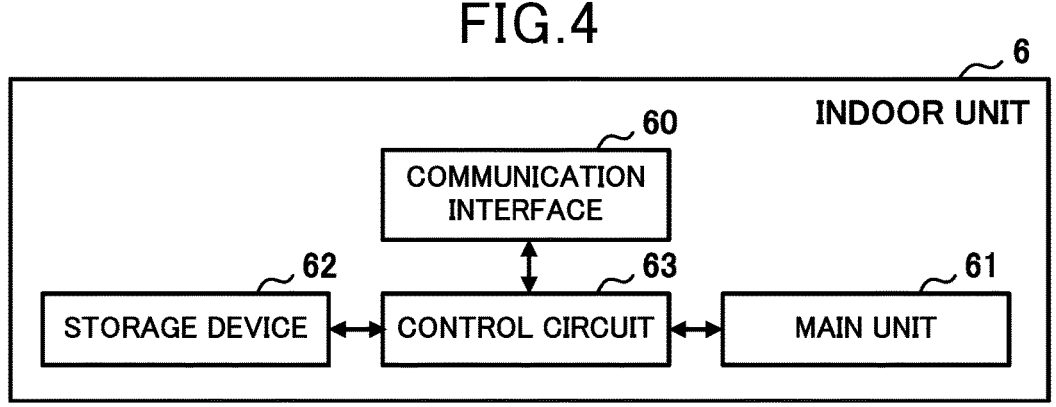
FIG. 4 is a block diagram illustrating hardware configuration of an indoor unit according to Embodiment 1.

Each of the indoor units 6 includes, as illustrated in FIG. 4, a communication interface 60, a main unit 61, a storage device 62, and a control circuit 63. The communication interface 60 is hardware for communication with another device by the first communication method via the communication line 4.

The main unit 61 is a component for achievement of fundamental functions of a general indoor unit, and includes, for example, a fan, a heat exchanger, a temperature sensor, a humidity sensor, and the like. A measurement result of each sensor included in the main unit 61 is transmitted periodically to a corresponding outdoor unit 5, that is, the outdoor unit 5 included in the same refrigerant system.

The storage device 62 includes a readable/rewritable nonvolatile semiconductor memory, such as an EEPROM and a flash memory. The storage device 62 stores various types of programs including a program related to operation control of the main unit 61 and data for use in execution of these programs.

The control circuit 63 includes a non-illustrated CPU, a non-illustrated ROM, and a non-illustrated RAM, and performs overall control of a corresponding indoor unit 6.

Figure 5:
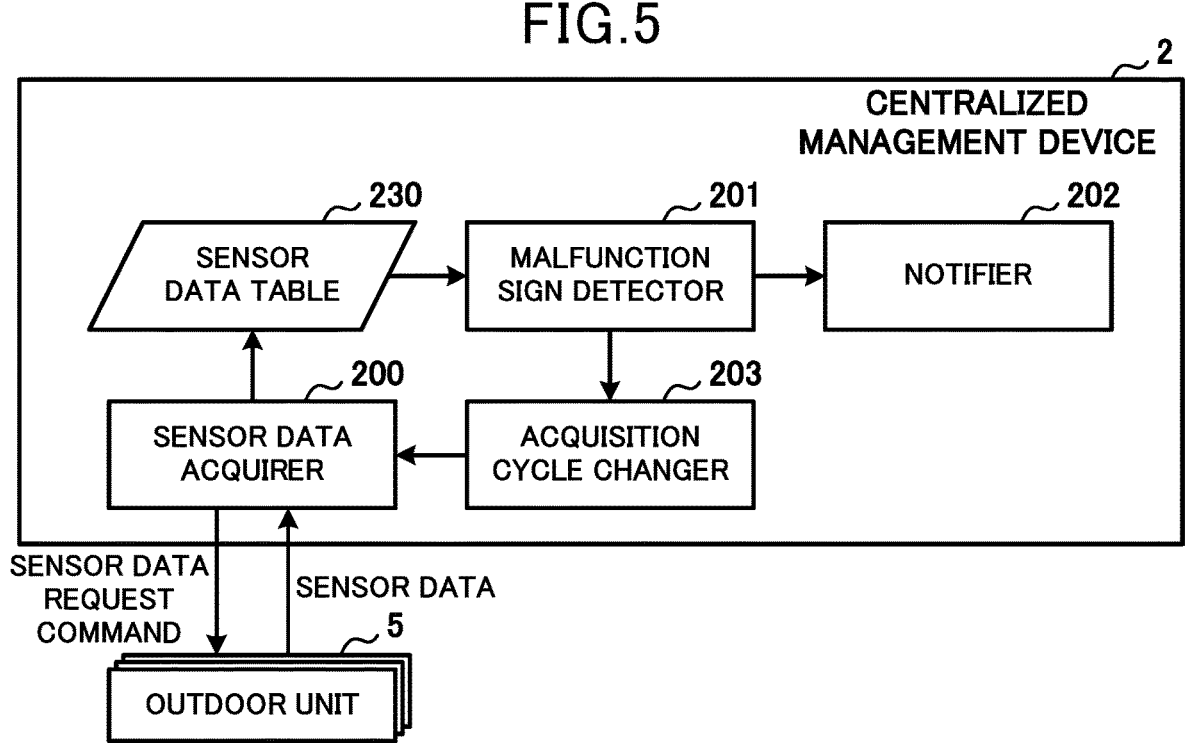
FIG. 5 illustrates functional configuration of the centralized management device according to Embodiment 1.

Next, functions of the centralized management device 2 are described in detail. As illustrated in FIG. 5, the centralized management device 2 functionally includes a sensor data acquirer 200, a malfunction sign detector 201, a notifier 202, and an acquisition cycle changer 203. These functional elements are achieved by execution, by the CPU of the control circuit 24, of the management program stored in the storage device 23.

The sensor data acquirer 200 is an example of sensor data acquisition means. The sensor data acquirer 200 periodically acquires the sensor data from each air conditioner 3. Specifically, the sensor data acquirer 200 transmits a command requesting the sensor data that is hereinafter referred to as the sensor data request command to the outdoor unit 5 of each air conditioner 3 via the communication line 4 on an ordinary cycle or a shortened cycle for each air conditioner 3.

In the present embodiment, the ordinary cycle is, for example, a one-minute cycle, and the shortened cycle is a cycle that is shorter than the ordinary cycle, such as a one-second cycle. At a time of startup of the air-conditioning system 1, as a default acquisition cycle of the sensor data on which the sensor data is acquired, the ordinary cycle is commonly set for the air conditioners 3. The acquisition cycle of the sensor data for each air conditioner 3 is changed appropriately by the acquisition cycle changer 203 in a manner described later.

The outdoor unit 5 of each air conditioner 3 includes as a functional element a non-illustrated sensor data transmitter, and upon receiving the sensor data request command via the communication line 4, generates the sensor data storing the measurement result of each sensor included by the local unit. The outdoor unit 5 transmits the generated sensor data to the centralized management device 2 via the communication line 4. The sensor data transmitter is an example of sensor data transmission means. The sensor data may include, in addition to the measurement result of each sensor, other data relating to an operation state of the outdoor unit 5, such as an instruction value from the control circuit 53 for operation of the main unit 51.

The sensor data acquirer 200 receives and acquires the sensor data sent from the outdoor unit 5 of each air conditioner 3 via the communication line 4 in response to the sensor data request command. The sensor data acquirer 200 stores each acquired sensor data in a sensor data table 230.

The sensor data table 230 is a data table for storage of a history of the sensor data for each air conditioner 3 and is stored in the storage device 23. The sensor data table 230 stores, for example, the sensor data for each air conditioner 3 for the last one week.

The malfunction sign detector 201 detects a sign of malfunction in each air conditioner 3, more specifically, in the outdoor unit 5 included by each air conditioner 3, based on the history of the sensor data for the air conditioner 3 that is stored in the sensor data table 230. The "sign of malfunction" means that the air conditioner 3, although not in a state in which malfunction or operational abnormality is occurring, deviates from a range of normal operation and thus is in a state that is expected to lead to occurrence of malfunction or operational abnormality in the near future. The malfunction sign detector 201 determines whether the sign of malfunction is present in each air conditioner 3 based on, for example, a relationship between an operating frequency and an operating current value of the compressor, a relationship between a temperature of the refrigerant piping and a pressure of the refrigerant piping, a relationship between an operating current value of a fan motor and an instruction value for operation of the fan motor, or the like.

Upon detecting the sign of malfunction in any of the air conditioners 3, the malfunction sign detector 201 issues to the notifier 202 and the acquisition cycle changer 203 a malfunction sign detection notification that includes (i) information indicating that the sign of malfunction is detected and (ii) a device ID of the outdoor unit 5 included by the air conditioner 3 for which the sign of malfunction is detected. The device ID is an identification (ID) for identifying each device included in the air-conditioning system 1 such as the outdoor units 5 and the indoor units 6.

Upon issuance of the malfunction sign detection notification from the malfunction sign detector 201, the notifier 202 notifies the user that the sign of malfunction is detected in the outdoor unit 5 corresponding to the device ID. Specifically, the notifier 202 generates notification information associating (i) a current time, (ii) information that allows the user to recognize the outdoor unit 5 concerned, such as a model number of the outdoor unit 5 concerned, and (iii) information indicating that the sign of malfunction is detected, and displays the generated notification information on the display 22.

The acquisition cycle changer 203 is an example of change means. Upon issuance of the malfunction sign detection notification from the malfunction sign detector 201, the acquisition cycle changer 203 shortens the acquisition cycle of the sensor data for the air conditioner 3 for which the sign of malfunction is detected. Specifically, the acquisition cycle changer 203 changes the acquisition cycle of the sensor data for the outdoor unit 5 corresponding to the device ID included in the malfunction sign detection notification, from the aforementioned ordinary cycle to the aforementioned shortened cycle.

In the case in which a current acquisition cycle of the sensor data for the outdoor unit 5 concerned is the shortened cycle, the acquisition cycle changer 203 does not change the acquisition cycle for the outdoor unit 5 concerned. Further, upon performance of an operation via the operation receiver 21 by the user to change back to the ordinary cycle the acquisition cycle of the outdoor unit 5 for which the shortened cycle is set as the acquisition cycle of the sensor data, the acquisition cycle changer 203 changes the acquisition cycle of the sensor data for the outdoor unit 5 concerned from the shortened cycle to the ordinary cycle.

When the outdoor unit 5 for which the shortened cycle is set as the acquisition cycle of the sensor data, that is, the outdoor unit 5 whose operation is analyzed in detail and for which a high-accuracy determination is made of whether the sign of malfunction is present, satisfies a predetermined condition for restoration to the ordinary cycle, for example, satisfies the condition that the sign of malfunction is not detected for a fixed time period, the user can change the acquisition cycle for the outdoor unit 5 concerned back to the ordinary cycle through an operation via the operation receiver 21.

Upon changing the acquisition cycle, the acquisition cycle changer 203 issues, to the sensor data acquirer 200, cycle change notification including the device ID of the outdoor unit 5 concerned and the post-change acquisition cycle. Upon issuance of the cycle change notification, the sensor data acquirer 200 changes thereafter, to the notified acquisition cycle, the acquisition cycle of the sensor data for the outdoor unit 5 concerned.

FIG. 6 is a flowchart illustrating a process of acquisition cycle change processing executed by the centralized management device 2. The centralized management device 2 repeatedly executes the acquisition cycle change processing at every fixed time interval, for example, at every one-minute interval.

The malfunction sign detector 201 of the centralized management device 2 determines whether the sign of malfunction is present in each air conditioner 3 by analyzing the history of the sensor data for the air conditioner 3 that is stored in the sensor data table 230 (step S101). When the sign of malfunction is present in any of the air conditioners 3 (YES in step S102), the processing by the centralized management device 2 shifts to step S103. Conversely, when the sign of malfunction is not present in the air conditioners 3 (NO in step S102), the centralized management device 2 ends the acquisition cycle change processing in the current cycle.

In step S103, the notifier 202 notifies the user that the sign of malfunction is detected in the air conditioner 3 concerned. After step S103, the acquisition cycle changer 203 determines whether the current acquisition cycle of the sensor data for the air conditioner 3 concerned is the ordinary cycle (step S104).

When the current acquisition cycle of the sensor data for the air conditioner 3 concerned is not the ordinary cycle (NO in step S104), that is, when the current acquisition cycle of the sensor data for the air conditioner 3 concerned is the shortened cycle, the centralized management device 2 ends the acquisition cycle change processing in the current cycle. Conversely, when the current acquisition cycle of the sensor data for the air conditioner 3 concerned is the ordinary cycle (YES in step S104), the acquisition cycle changer 203 changes the acquisition cycle of the sensor data for the air conditioner 3 concerned to the shortened cycle (step S105). Thereafter, the centralized management device 2 ends the acquisition cycle change processing in the current cycle.

As described above, according to the air-conditioning system 1 of Embodiment 1, when the sign of malfunction is detected in the air conditioner 3, the centralized management device 2 changes the acquisition cycle of the sensor data for the air conditioner 3 for which the sign of malfunction is detected to the shortened cycle that is shorter than the ordinary cycle. This enables more detailed operation analysis for the air conditioner 3 concerned by use of the sensor data acquired at short intervals, thereby enabling higher-accuracy detection of the sign of malfunction, such as detection of extent of the sign of malfunction and identification of a corresponding part. Additionally, since the centralized management device 2 acquires the sensor data from each air conditioner 3 on the ordinary cycle until the sign of malfunction is detected, an unnecessary increase in communication traffic can be prevented.

Modified Example 1

In Embodiment 1, upon detection of the sign of malfunction, the acquisition cycle of the sensor data from the air conditioner 3 for which the sign of malfunction is detected is shortened. However, changing to enhance the sensor data acquired from the air conditioner 3 concerned may be performed instead of or in conjunction with the shortening. In this case, the centralized management device 2 further includes a non-illustrated data enhancer as a functional element. The data enhancer is an example of the change means. The data enhancer requests the outdoor unit 5 of the air conditioner 3 for which the sign of malfunction is detected to, for example, (i) increase the number of types of sensors whose measurement results are to be stored in the sensor data or (ii) increase resolution of the measurement result of each sensor that is to be stored in the sensor data.

The case of increasing the types of sensors is described below. The centralized management device 2, for example, (i) acquires, until the sign of malfunction is detected, from each of the outdoor units 5, the sensor data storing measurement results of predetermined four types of sensors and (ii) acquires, when the sign of malfunction is detected, from the outdoor unit 5 for which the sign of malfunction is detected, the sensor data that additionally stores measurement results of additional two types of sensors. A sensor type requested to be added may be predetermined in the air-conditioning system 1 or may be specified by the centralized management device 2.

The case of increasing resolution of the sensors is described below. From the viewpoint of reducing an amount of communication data, the sensor data from each of sensors of each outdoor unit 5 in the air-conditioning system 1 normally stores a value obtained by rounding the measurement result of the sensor, for example, a value having a reduced number of decimal places. In contrast, when the sign of malfunction is detected, the outdoor unit 5 concerned generates, in response to a request from the centralized management device 2 for increasing resolution, the sensor data storing a non-rounded measurement result of each sensor, and transmits the generated sensor data to the centralized management device 2.

Enhancing the sensor data acquired by the centralized management device 2 as described above enables more detailed operation analysis for the air conditioner 3 concerned, thereby enabling higher-accuracy detection of the sign of malfunction, such as detection of extent of the sign of malfunction and identification of a corresponding part. Although enhancing the sensor data increases the amount of communication data, since the centralized management device 2 acquires ordinary sensor data from each air conditioner 3 until the sign of malfunction is detected, an unnecessary increase in communication traffic can be prevented.

Modified Example 2

In Embodiment 1, when the sign of malfunction is not detected for a fixed time period in the outdoor unit 5 for which the shortened cycle is set as the acquisition cycle of the sensor data, that is, the outdoor unit 5 for which a high-accuracy determination is made of whether the sign of malfunction is present, the user changes the acquisition cycle for the outdoor unit 5 concerned back to the ordinary cycle through an operation via the operation receiver 21. A determination of whether restoration to the ordinary cycle is necessary as described above may be made by a non-illustrated restoration necessity determiner that the centralized management device 2 further includes.

When the sign of malfunction is not detected over a duration of a predetermined time period in an outdoor unit 5 from which the sensor data is acquired on the shortened cycle, the restoration necessity determiner determines for the outdoor unit 5 concerned that restoration to the ordinary cycle is necessary. Upon determining that restoration to the ordinary cycle is necessary, the restoration necessity determiner issues, to the acquisition cycle changer 203, notification that is hereinafter referred to as the restoration notification and is for restoring the acquisition cycle of the sensor data for the outdoor unit 5 concerned to the ordinary cycle. Upon issuance of the restoration notification, the acquisition cycle changer 203 changes the acquisition cycle of the sensor data for the outdoor unit 5 concerned from the shortened cycle to the ordinary cycle.

In the case of applying Modified Example 2 to Modified Example 1, the restoration necessity determiner determines whether restoration to the ordinary sensor data is necessary under a condition similar to above, and upon determining that restoration to the ordinary sensor data is necessary, issues notification to that effect to the data enhancer. Upon issuance of such notification, the data enhancer cancels requesting for the outdoor unit 5 concerned to enhance the sensor data.

Modified Example 3

Although detection of the sign of malfunction is performed by the centralized management device 2 in Embodiment 1, detection of the sign of malfunction for each air conditioner 3 may be performed by a non-illustrated malfunction sign detection device connected to the centralized management device 2 via a local area network (LAN), the Internet, or the like. In this case, the malfunction sign detection device sends, to the centralized management device 2, notification of results of detection of the sign of malfunction for the air conditioners 3. In the case of applying Modified Example 3 to Modified Example 2, the malfunction sign detection device may include the restoration necessity determiner.

Modified Example 4

After lapse of a predetermined time period from restoration to the ordinary cycle or to the ordinary sensor data, for the outdoor unit 5 concerned, the centralized management device 2 may re-shorten the acquisition cycle of the sensor data or re-enhance the sensor data to be acquired.

Modified Example 5

The centralized management device 2 may change, upon shortening the acquisition cycle of the sensor data or enhancing the sensor data to be acquired for any of the air conditioners 3, the acquisition cycle of the sensor data for another air conditioner 3 for which the sign of malfunction is not detected to a cycle longer than the ordinary cycle, for example, from a one-minute cycle to a two-minute cycle. This configuration enables preventing occurrence of an increase in communication traffic even after detection of the sign of malfunction in any of the air conditioners 3.

Modified Example 6

The centralized management device 2 may determine the acquisition cycle of the sensor data for each of before and after detection of the sign of malfunction based on a number of devices, such as the outdoor units 5 and the indoor units 6, connected to the communication line 4 in the air-conditioning system 1. This configuration allows the centralized management device 2 to acquire the sensor data on an appropriate cycle that is based on scale of the air-conditioning system 1, thereby enabling higher-accuracy detection of the sign of malfunction.

Modified Example 7

The sensor data acquired by the centralized management device 2 from each outdoor unit 5 may include measurement results of one or more sensors included by each indoor unit 6. In this case, the centralized management device 2 may determine whether the sign of malfunction is present for the indoor units 6, in addition to the outdoor units 5. The centralized management device 2, when the sign of malfunction is detected in any of the indoor units 6, may change to the shortened cycle the acquisition cycle of the sensor data for the outdoor unit 5 corresponding to the indoor unit 6 for which the sign of malfunction is detected.

In the case of applying Modified Example 7 to Modified Example 1, when the sign of malfunction is detected in any of the indoor units 6 of a certain air conditioner 3, the centralized management device 2 may perform enhancement targeted only for the measurement result of each sensor of the indoor unit 6 for which the sign of malfunction is detected or may perform enhancement targeted for the measurement result of each sensor of all indoor units 6 included by such air conditioner 3.

Modified Example 8

Each of the outdoor units 5 may determine, for each of the indoor units 6 corresponding to the local unit, based on the measurement results acquired from one or more sensors included by the indoor unit 6, whether the sign of malfunction is present in the indoor unit 6. In this case, each of the outdoor units 5 may store, in the sensor data to be transmitted to the centralized management device 2, presence/absence of the sign of malfunction in each indoor unit 6.

Modified Example 9

In Embodiment 1, the communication method in a transmission line between the centralized management device 2 and each of the outdoor units 5 that is a so-called integrated transmission line and the communication method in a transmission line between the outdoor unit 5 and each of the indoor units 6 in each air conditioner 3 that is so-called an internal/external transmission line are common. However, the integrated transmission line and the interval/external transmission line may employ mutually different communication methods.

For example, in the air-conditioning system 1 illustrated in FIG. 7, although communication in the integrated transmission line is performed by the first communication method similarly to Embodiment 1, communication in the interval/external transmission line is performed by a second communication method that is different from the first communication method. Specifically, communication between the outdoor unit 5a and each of the indoor units 6a and 6b is performed by the second communication method via a communication line 7a. Additionally, communication between the outdoor unit 5b and each of the indoor units 6c and 6d is performed by the second communication method via a communication line 7b. For example, a baseband method for asynchronous communication at 9,600 bps is employed as the second communication method.

Modified Example 10

In the air-conditioning system 1 according to Modified Example 9, when a change in the acquisition cycle of the sensor data to the shortened cycle is made by the centralized management device 2 for any of the air conditioners 3, the outdoor unit 5 of the air conditioner 3 concerned may shorten the cycle on which the measurement result of each sensor is acquired from each of the indoor units 6.

Modified Example 11

Each air conditioner 3, more specifically, each of the outdoor units 5, (i) may include a non-illustrated transmission cycle changer that changes, upon detection of the sign of malfunction in the local air conditioner, a transmission cycle for transmission of the sensor data to the centralized management device 2 to the shortened cycle that is shorter than the ordinary cycle or (ii) may include a non-illustrated data enhancer that enhances the sensor data upon detection of the sign of malfunction in the local air conditioner. The data enhancer (i) increases the number of types of sensors whose measurement results are to be stored in the sensor data or (ii) increases resolution of the measurement result of each sensor. The transmission cycle changer and the data enhancer are examples of change means in an air conditioner. In this case, each air conditioner 3 may by itself detect the sign of malfunction, or notification of a result of detection of the sign of malfunction may be sent to the air conditioner 3 by the centralized management device 2 or the malfunction sign detection device according to Modified Example 3.

Embodiment 2

Next, Embodiment 2 of the present disclosure is described. In the explanation below, structural elements or the like that are common with Embodiment 1 are assigned the same reference sign, and explanation for such elements is omitted.

FIG. 8 illustrates overall configuration of an air-conditioning system 1' according to Embodiment 2. Similarly to the air-conditioning system 1 according to Embodiment 1, the air-conditioning system 1' is, for example, a multi-type building air-conditioning system for air conditioning of a building such as an office building, and includes a cloud server 8 and air conditioners 3'*a*, 3'*b*, and the like.

Each of the air conditioners 3'*a*, 3'*b*, and the like includes one outdoor unit and one or more indoor units. For example, the air conditioner 3'*a* includes an outdoor unit 5'*a*, an indoor unit 6'*a*, and an indoor unit 6'*b*, and the air conditioner 3'*b* includes an outdoor unit 5'*b*, an indoor unit 6'*c*, and an indoor unit 6'*d*. Although not illustrated, each of the air conditioners 3'*a*, 3'*b*, and the like includes a dedicated remote controller for receiving an operation related to air conditioning from the user.

The outdoor unit 5'*a* and the indoor units 6'*a* and 6'*b* are connected via non-illustrated refrigerant piping for circulation of refrigerant. That is to say, the outdoor unit 5'*a* and the indoor units 6'*a* and 6'*b* are included in one refrigerant system. Communication between the outdoor unit 5'*a* and each of the indoor units 6'*a* and 6'*b*, that is, communication in the internal/external transmission line, is performed by a third communication method via the communication line 7*a*. For example, a baseband method for asynchronous communication at 9,600 bps is employed as the third communication method.

The outdoor unit 5'*b* and the indoor units 6'*c* and 6'*d* are connected via refrigerant piping that is different from the refrigerant piping between the outdoor unit 5'*a* and the indoor units 6'*a* and 6'*b*. That is to say, the outdoor unit 5'*b* and the indoor units 6'*c* and 6'*d* are included in one refrigerant system. Communication between the outdoor unit 5'*b* and each of the indoor units 6'*c* and 6'*d*, that is, communication in the internal/external transmission line, is performed by the third communication method via the communication line 7*b*.

Hereinafter, in explanation of matters that are common between the outdoor units 5'*a* and 5'*b*, these outdoor units are referred to as the outdoor units 5' without individual designation, and in explanation of matters that are common among the indoor units 6'*a*-6'*d*, these indoor units are referred to as the indoor units 6' without individual designation, and additionally, in explanation of matters that are common between the communication lines 7*a* and 7*b*, these communication lines are referred to as the communication lines 7 without individual designation.

Figure 9:
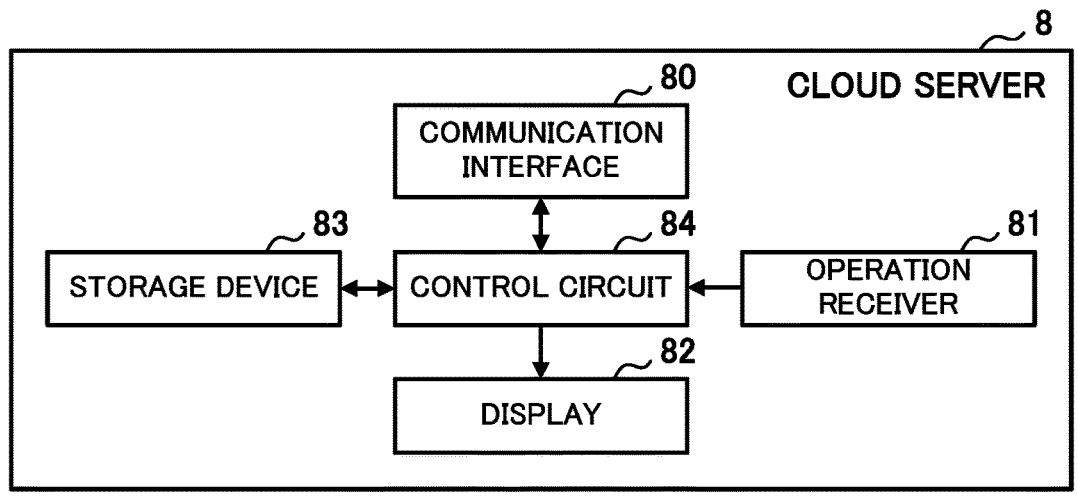
FIG. 9 is a block diagram illustrating hardware configuration of a cloud server according to Embodiment 2.

The cloud server 8 is an example of the management device, is a device for centrally managing the air conditioners 3'*a*, 3'*b*, and the like, and is arranged in a location that is different from the location of the building and is away from the building. As illustrated in FIG. 9, the cloud server 8 includes a communication interface 80, an operation receiver 81, a display 82, a storage device 83, and a control circuit 84.

The communication interface 80 is hardware for communication with the outdoor unit 5' of each air conditioner 3' via a wide-area communication network constructed by a wide-area wireless base station 9. The wide-area wireless base station 9 is a wireless base station established by a telecommunications provider that is a so-called carrier, and enables, for example, wireless communication based on Low Power Wide Area (LPWA) in the Fifth-Generation Mobile Communications System (5G).

The operation receiver 81 includes one or more input devices, such as a keyboard, a mouse, a key pad, a push-button, a touch panel, and a touch pad, receives an input operation from a user, and sends to the control circuit 84 a signal according to the received input operation.

The display 82 includes a display device, such as a CRT display, a liquid crystal display, an organic EL display, and a plasma display. The display 82 displays, under control by the control circuit 84, a screen or the like for managing each air conditioner 3'.

The storage device 83 includes a readable/rewritable nonvolatile semiconductor memory such as an electrically erasable programmable read-only memory (EEPROM) and a flash memory, a hard disk drive (HDD), or the like. The storage device 83 stores a management program for management of each air conditioner 3', and data for use in execution of such management program.

The control circuit 84 includes, for example, a CPU, a ROM, and a RAM, and performs overall control of the cloud server 8. Functions of the cloud server 8 that are achieved by the control circuit 84 are described later in detail.

Figure 10:
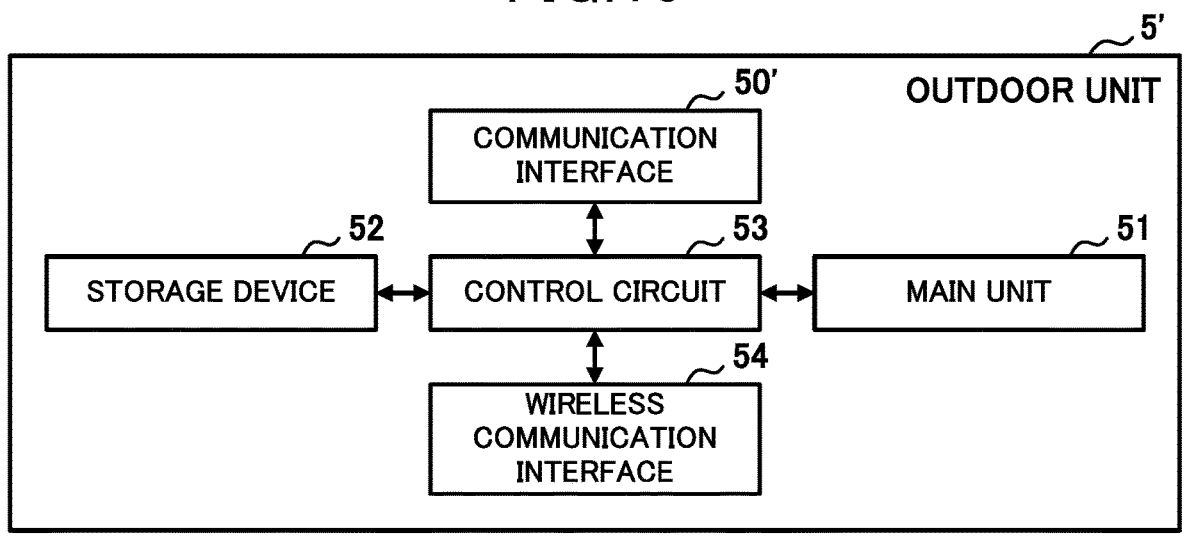
FIG. 10 is a block diagram illustrating hardware configuration of an outdoor unit according to Embodiment 2.

Each of the outdoor units 5' includes, as illustrated in FIG. 10, the communication interface 50', the main unit 51, the storage device 52, the control circuit 53, and a wireless communication interface 54. That is to say, hardware configuration of each of the outdoor units 5' is different from that of the outdoor units 5 of Embodiment 1 in that the communication interface 50' is included instead of the communication interface 50 and the wireless communication interface 54 is additionally included.

The communication interface 50' is hardware for communication with each of the indoor units 6' by the third communication method via the communication lines 7. The wireless communication interface 54 is hardware for communication with the cloud server 8 via the aforementioned wide-area communication network.

Figure 11:
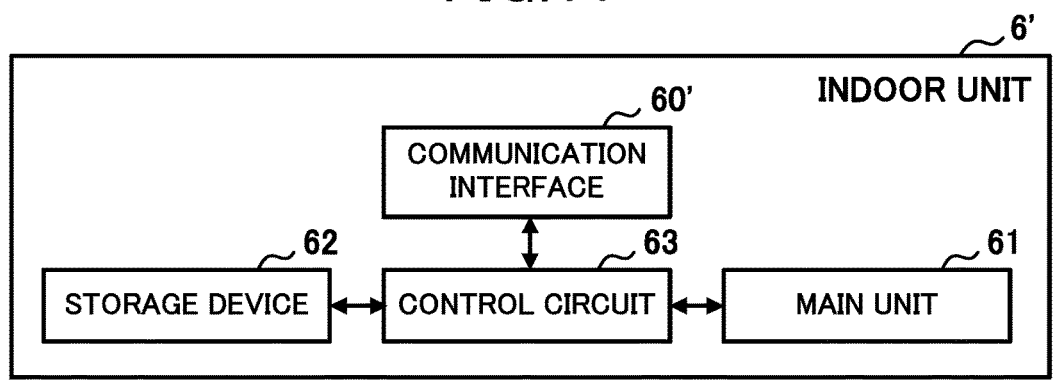
FIG. 11 is a block diagram illustrating hardware configuration of an indoor unit according to Embodiment 2.

Each of the indoor units 6' includes, as illustrated in FIG. 11, a communication interface 60', the main unit 61, the storage device 62, and the control circuit 63. That is to say, hardware configuration of each of the indoor units 6' is different from that of the indoor units 6 of Embodiment 1 in that the communication interface 60' is included instead of the communication interface 60. The communication interface 60' is hardware for communication with the outdoor units 5' by the third communication method via the communication lines 7.

Figure 12:
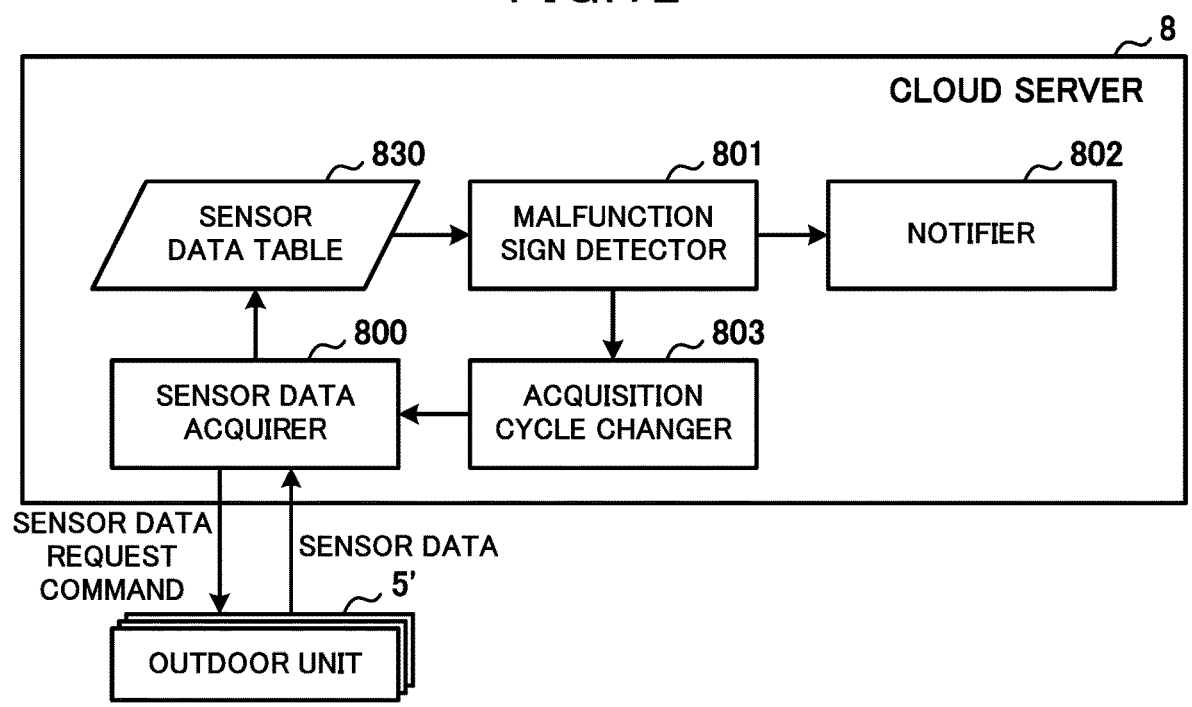
FIG. 12 illustrates functional configuration of the cloud server according to Embodiment 2.

Next, functions of the cloud server 8 are described in detail. As illustrated in FIG. 12, the cloud server 8 functionally includes a sensor data acquirer 800, a malfunction sign detector 801, a notifier 802, and an acquisition cycle changer 803. These functional elements are achieved by execution, by the CPU of the control circuit 84, of the management program stored in the storage device 83.

The sensor data acquirer 800 is an example of sensor data acquisition means. The sensor data acquirer 800 periodically acquires the sensor data from each air conditioner 3'. Specifically, the sensor data acquirer 800 transmits a command requesting the sensor data that is hereinafter referred to as the sensor data request command to the outdoor unit 5' of each air conditioner 3' via the wide-area communication network on the ordinary cycle or the shortened cycle for each air conditioner 3'.

In the present embodiment, the ordinary cycle is, for example, a one-minute cycle, and the shortened cycle is a cycle that is shorter than the ordinary cycle, such as a one-second cycle. At a time of startup of the air-conditioning system 1', as a default acquisition cycle of the sensor data on which the sensor data is acquired, the ordinary cycle is commonly set for the air conditioners 3'. The acquisition cycle of the sensor data for each air conditioner 3' is changed appropriately by the acquisition cycle changer 803 in a manner described later.

The outdoor unit 5' of each air conditioner 3' includes as a functional element a non-illustrated sensor data transmitter, and upon receiving the sensor data request command via the wide-area communication network, generates the sensor data storing the measurement result of each sensor included by the local unit. The outdoor unit 5' transmits the generated sensor data to the cloud server 8 via the wide-area communication network. The sensor data transmitter is an example of the sensor data transmission means. The sensor data may include, in addition to the measurement result of each sensor, other data relating to an operation state of the outdoor unit 5', such as an instruction value from the control circuit 53 for operation of the main unit 51.

The sensor data acquirer 800 receives and acquires the sensor data sent from the outdoor unit 5' of each air conditioner 3' via the wide-area communication network in response to the sensor data request command. The sensor data acquirer 800 stores each acquired sensor data in a sensor data table 830.

The sensor data table 830 is a data table for storage of a history of the sensor data for each air conditioner 3' and is stored in the storage device 83. The sensor data table 830 stores, for example, the sensor data for each air conditioner 3' for the last one week.

The malfunction sign detector 801 detects the sign of malfunction in each air conditioner 3', more specifically, in the outdoor unit 5' included by each air conditioner 3', based on the history of the sensor data for the air conditioner 3' that is stored in the sensor data table 830. The "sign of malfunction" means that the air conditioner 3', although not in a state in which malfunction or operational abnormality is occurring, deviates from a range of normal operation and thus is in a state that is expected to lead to occurrence of malfunction or operational abnormality in the near future. The malfunction sign detector 801 determines whether the sign of malfunction is present in each air conditioner 3' based on, for example, a relationship between an operating frequency and an operating current value of the compressor, a relationship between a temperature of the refrigerant piping and a pressure of the refrigerant piping, a relationship between an operating current value of a fan motor and an instruction value for operation of the fan motor, or the like.

Upon detecting the sign of malfunction in any of the air conditioners 3', the malfunction sign detector 801 issues to the notifier 802 and the acquisition cycle changer 803 a malfunction sign detection notification that includes (i) information indicating that the sign of malfunction is detected and (ii) a device ID of the outdoor unit 5' included by the air conditioner 3' for which the sign of malfunction is detected. The device ID is an ID for identifying each device included in the air-conditioning system 1' such as the outdoor units 5' and the indoor units 6'.

Upon issuance of the malfunction sign detection notification from the malfunction sign detector 801, the notifier 802 notifies the user that the sign of malfunction is detected in the outdoor unit 5' corresponding to the device ID. Specifically, the notifier 802 generates notification information associating (i) a current time, (ii), information that allows the user to recognize the outdoor unit 5' concerned, such as a model number of the outdoor unit 5' concerned, and (iii) information indicating that the sign of malfunction is detected, and displays the generated notification information on the display 82.

The acquisition cycle changer 803 is an example of the change means. Upon issuance of the malfunction sign detection notification from the malfunction sign detector 801, the acquisition cycle changer 803 shortens the acquisition cycle of the sensor data for the air conditioner 3' for which the sign of malfunction is detected. Specifically, the acquisition cycle changer 803 changes the acquisition cycle of the sensor data for the outdoor unit 5' corresponding to the device ID included in the malfunction sign detection notification, from the aforementioned ordinary cycle to the aforementioned shortened cycle.

In the case in which a current acquisition cycle of the sensor data for the outdoor unit 5' concerned is the shortened cycle, the acquisition cycle changer 803 does not change the acquisition cycle for the outdoor unit 5' concerned. Further, upon performance of an operation via the operation receiver 81 by the user to change back to the ordinary cycle the acquisition cycle of the outdoor unit 5' for which the shortened cycle is set as the acquisition cycle of the sensor data, the acquisition cycle changer 803 changes the acquisition cycle of the sensor data for the outdoor unit 5' concerned from the shortened cycle to the ordinary cycle.

When the outdoor unit 5' for which the shortened cycle is set as the acquisition cycle of the sensor data, that is, the outdoor unit 5' whose operation is analyzed in detail and for which a high-accuracy determination is made of whether the sign of malfunction is present, satisfies a predetermined condition for restoration to the ordinary cycle, for example, satisfies the condition that the sign of malfunction is not detected for a fixed time period, the user can change the acquisition cycle for the outdoor unit 5' concerned back to the ordinary cycle through an operation via the operation receiver 81.

Upon changing the acquisition cycle, the acquisition cycle changer 803 issues, to the sensor data acquirer 800, cycle change notification including the device ID of the outdoor unit 5' concerned and the post-change acquisition cycle. Upon issuance of the cycle change notification, the sensor data acquirer 800 changes thereafter, to the notified acquisition cycle, the acquisition cycle of the sensor data for the outdoor unit 5' concerned.

A process of acquisition cycle change processing executed by the cloud server 8 is similar to that performed by the centralized management device 2 of Embodiment 1 (refer to FIG. 6).

As described above, according to the air-conditioning system 1' of Embodiment 2, when the sign of malfunction is detected in the air conditioner 3', the cloud server 8 changes the acquisition cycle of the sensor data for the air conditioner 3' for which the sign of malfunction is detected to the shortened cycle that is shorter than the ordinary cycle. This enables more detailed operation analysis for the air conditioner 3' concerned by use of the sensor data acquired at short intervals, thereby enabling higher-accuracy detection of the sign of malfunction, such as detection of extent of the sign of malfunction and identification of a corresponding part. Additionally, since the cloud server 8 acquires the sensor data from each air conditioner 3' on the ordinary cycle until the sign of malfunction is detected, an unnecessary increase in communication traffic can be prevented.

Modified Example 1

In Embodiment 2, upon detection of the sign of malfunction, the acquisition cycle of the sensor data from the air conditioner 3' for which the sign of malfunction is detected is shortened. However, changing to enhance the sensor data acquired from the air conditioner 3' concerned may be performed instead of or in conjunction with the shortening. In this case, the cloud server 8 further includes a non-illustrated data enhancer as a functional element. The data enhancer is an example of the change means. The data enhancer requests the outdoor unit 5' of the air conditioner 3' for which the sign of malfunction is detected to, for example, (i) increase the number of types of sensors whose measurement results are to be stored in the sensor data or (ii) increase resolution of the measurement result of each sensor that is to be stored in the sensor data.

The case of increasing the types of sensors is described below. The cloud server 8, for example, (i) acquires, until the sign of malfunction is detected, from each of the outdoor units 5', the sensor data storing measurement results of predetermined four types of sensors and (ii) acquires, when the sign of malfunction is detected, from the outdoor unit 5' for which the sign of malfunction is detected, the sensor data that additionally stores measurement results of additional two types of sensors. A sensor type requested to be added may be predetermined in the air-conditioning system 1' or may be specified by the cloud server 8.

The case of increasing resolution of the sensors is described below. From the viewpoint of reducing an amount of communication data, the sensor data from each of sensors of each outdoor unit 5' in the air-conditioning system 1' normally stores a value obtained by rounding the measurement result of the sensor, for example, a value having a reduced number of decimal places. In contrast, when the sign of malfunction is detected, the outdoor unit 5' concerned generates, in response to a request from the cloud server 8 for increasing resolution, the sensor data storing a non-rounded measurement result of each sensor, and transmits the generated sensor data to the cloud server 8.

Enhancing the sensor data acquired by the cloud server 8 as described above enables more detailed operation analysis for the air conditioner 3' concerned, thereby enabling higher-accuracy detection of the sign of malfunction, such as detection of extent of the sign of malfunction and identification of a corresponding part. Although enhancing the sensor data increases the amount of communication data, since the cloud server 8 acquires ordinary sensor data from each air conditioner 3' until the sign of malfunction is detected, an unnecessary increase in communication traffic can be prevented.

Modified Example 2

In Embodiment 2, when the sign of malfunction is not detected for a fixed time period in the outdoor unit 5' for which the shortened cycle is set as the acquisition cycle of the sensor data, that is, the outdoor unit 5' for which a high-accuracy determination is made of whether the sign of malfunction is present, the user changes the acquisition cycle for the outdoor unit 5' concerned back to the ordinary cycle through an operation via the operation receiver 81. A determination of whether restoration to the ordinary cycle is necessary as described above may be made by a non-illustrated restoration necessity determiner that the cloud server 8 further includes.

When the sign of malfunction is not detected over a duration of a predetermined time period in an outdoor unit 5' from which the sensor data is acquired on the shortened cycle, the restoration necessity determiner determines for the outdoor unit 5' concerned that restoration to the ordinary cycle is necessary. Upon determining that restoration to the ordinary cycle is necessary, the restoration necessity determiner issues, to the acquisition cycle changer 803, notification that is hereinafter referred to as the restoration notification and is for restoring the acquisition cycle of the sensor data for the outdoor unit 5' concerned to the ordinary cycle.

Upon issuance of the restoration notification, the acquisition cycle changer 803 changes the acquisition cycle of the sensor data for the outdoor unit 5' concerned from the shortened cycle to the ordinary cycle.

In the case of applying Modified Example 2 to Modified Example 1, the restoration necessity determiner determines whether restoration to the ordinary sensor data is necessary under a condition similar to above, and upon determining that restoration to the ordinary sensor data is necessary, issues notification to that effect to the data enhancer. Upon issuance of such notification, the data enhancer cancels requesting for the outdoor unit 5' concerned to enhance the sensor data.

Modified Example 3

Although detection of the sign of malfunction is performed by the cloud server 8 in Embodiment 2, detection of the sign of malfunction for each air conditioner 3' may be performed by a non-illustrated malfunction sign detection device connected to the cloud server 8 via a LAN, the Internet, or the like. In this case, the malfunction sign detection device sends, to the cloud server 8, notification of results of detection of the sign of malfunction for the air conditioners 3'. In the case of applying Modified Example 3 to Modified Example 2, the malfunction sign detection device may include the restoration necessity determiner.

Modified Example 4

After lapse of a predetermined time period from restoration to the ordinary cycle or to the ordinary sensor data, for the outdoor unit 5' concerned, the cloud server 8 may re-shorten the acquisition cycle of the sensor data or re-enhance the sensor data to be acquired.

Modified Example 5

The cloud server 8 may change, upon shortening the acquisition cycle of the sensor data or enhancing the sensor data to be acquired for any of the air conditioners 3', the acquisition cycle of the sensor data for another air conditioner 3' for which the sign of malfunction is not detected to a cycle longer than the ordinary cycle, for example, from a one-minute cycle to a two-minute cycle. This configuration enables preventing occurrence of an increase in communication traffic even after detection of the sign of malfunction in any of the air conditioners 3'.

Modified Example 6

The sensor data acquired by the cloud server 8 from each outdoor unit 5' may include measurement results of one or more sensors included by each indoor unit 6'. In this case, the cloud server 8 may determine whether the sign of malfunction is present for the indoor units 6', in addition to the outdoor units 5'. The cloud server 8, when the sign of malfunction is detected in any of the indoor units 6', may change to the shortened cycle the acquisition cycle of the sensor data for the outdoor unit 5' corresponding to the indoor unit 6' for which the sign of malfunction is detected.

In the case of applying Modified Example 6 to Modified Example 1, when the sign of malfunction is detected in any of the indoor units 6' of a certain air conditioner 3', the cloud server 8 may perform enhancement targeted only for the measurement result of each sensor of the indoor unit 6' for which the sign of malfunction is detected or may perform enhancement targeted for the measurement result of each sensor of all indoor units 6' included by such air conditioner 3'.

Modified Example 7

Each of the outdoor units 5' may determine, for each of the indoor units 6' corresponding to the local unit, based on the measurement results acquired from one or more sensors included by the indoor unit 6', whether the sign of malfunction is present in the indoor unit 6'. In this case, each of the outdoor units 5' may store, in the sensor data to be transmitted to the cloud server 8, presence/absence of the sign of malfunction in each indoor unit 6'.

Modified Example 8

When a change in the acquisition cycle of the sensor data to the shortened cycle is made by the cloud server 8 for any of the air conditioners 3', the outdoor unit 5' of the air conditioner 3' concerned may shorten the cycle on which the measurement result of each sensor is acquired from each of the indoor units 6'.

Modified Example 9

Each air conditioner 3', more specifically, each of the outdoor units 5', (i) may include a non-illustrated transmission cycle changer that changes, upon detection of the sign of malfunction in the local air conditioner, a transmission cycle for transmission of the sensor data to the cloud server 8 to the shortened cycle that is shorter than the ordinary cycle or (ii) may include a non-illustrated data enhancer that enhances the sensor data upon detection of the sign of malfunction in the local air conditioner. The data enhancer (i) increases the number of types of sensors whose measurement results are to be stored in the sensor data or (ii) increases resolution of the measurement result of each sensor. The transmission cycle changer and the data enhancer are examples of the change means in an air conditioner. In this case, each air conditioner 3' may by itself detect the sign of malfunction, or notification of a result of detection of the sign of malfunction may be sent to the air conditioner 3' by the cloud server 8 or the malfunction sign detection device according to Modified Example 3.

The present disclosure is not limited to the aforementioned embodiments, and various modifications are of course possible without departing from the gist of the present disclosure.

For example, functional elements of the centralized management device 2 as illustrated in FIG. 5 may be achieved wholly or partially by dedicated hardware, and functional elements of the cloud server 8 as illustrated in FIG. 12 may be achieved wholly or partially by dedicated hardware. The dedicated hardware is, for example, a single circuit, a composite circuit, a programmed processor, an application specific integrated circuit (ASIC), a field-programmable gate array (FPGA), or a combination thereof.

Furthermore, the management program of each of the aforementioned embodiments can be distributed by storing the management program in a computer-readable recording medium, such as a compact disc read only memory (CD-ROM), a digital versatile disc (DVD), a magneto-optical disc, a universal serial bus (USB) memory, a memory card, and an HDD.

Furthermore, the management program of Embodiment 1 may be stored in a storage device included in a non-illustrated server on the Internet and may be downloaded from the server onto the centralized management device 2. Similarly, the management program of Embodiment 2 may be stored in a storage device included in a non-illustrated server on the Internet and may be downloaded from the server onto the cloud server 8.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be suitably used for an air-conditioning system that includes multiple indoor units.

The invention claimed is:

1. An air-conditioning system comprising:
a management device; and
one or more air conditioners,
the one or more air conditioners each comprising an outdoor unit and one or more indoor units,
the management device comprising
processing circuitry to
acquire sensor data during an acquisition cycle having an ordinary cycle and a shortened cycle that is shorter than the ordinary cycle, by communication, from each of the one or more air conditioners, the sensor data including measurement results of one or more sensors included by the air conditioner,
acquire the sensor data during the acquisition cycle beginning in the ordinary cycle, and
when a sign of malfunction is detected in any of the one or more air conditioners, make to the air conditioner for which the sign of malfunction is detected, a change of the acquisition cycle of the sensor data to the shortened cycle,
wherein the processing circuitry makes, when the sign of malfunction is detected in any of the one or more air conditioners, a change to lengthen the acquisition cycle of the sensor data for one or more of the air conditioners other than the air conditioner for which the sign of malfunction is detected.

2. The air-conditioning system according to claim 1, wherein, when the sign of malfunction is detected in any of the one or more air conditioners, the processing circuitry requests the air conditioner for which the sign of malfunction is detected to increase a number of types of sensors whose measurement results are to be stored in the sensor data.

3. The air-conditioning system according to claim 1, wherein, when the sign of malfunction is detected in any of the one or more air conditioners, the processing circuitry requests the air conditioner for which the sign of malfunction is detected to increase a number of types of sensors whose measurement results are to be stored in the sensor data.

4. The air-conditioning system according to claim 1, wherein, when the sign of malfunction is detected in any of the one or more air conditioners, the processing circuitry requests the air conditioner for which the sign of malfunction is detected to increase resolution of the measurement result of each of the one or more sensors that is to be stored in the sensor data.

5. A management device comprising:
processing circuitry to
  acquire sensor data during an acquisition cycle having an ordinary cycle and a shortened cycle that is shorter than the ordinary cycle, by communication, from each of one or more air conditioners that includes an outdoor unit and one or more indoor units, the sensor data including measurement results of one or more sensors included by the air conditioner,
  acquire the sensor data in the acquisition cycle beginning in the ordinary cycle, and
  make, when a sign of malfunction is detected in any of the one or more air conditioners, to the air conditioner for which the sign of malfunction is detected, a change of the acquisition cycle of the sensor data to the shortened cycle,
wherein the processing circuitry makes, when the sign of malfunction is detected in any of the one or more air conditioners, a change to lengthen the acquisition cycle of the sensor data for one or more of the air conditioners other than the air conditioner for which the sign of malfunction is detected.

6. A sensor data acquisition method comprising:
acquiring sensor data during an acquisition cycle having an ordinary cycle and a shortened cycle that is shorter than the ordinary cycle, by communication, from each of one or more air conditioners that includes an outdoor unit and one or more indoor units, the sensor data including measurement results of one or more sensors included by the air conditioner,
acquiring the sensor data during the acquisition cycle beginning in the ordinary cycle,
making, when a sign of malfunction is detected in any of the one or more air conditioners, to the air conditioner for which the sign of malfunction is detected, a change of the acquisition cycle of the sensor data to the shortened cycle, and
making, when the sign of malfunction is detected in any of the one or more air conditioners, a change to lengthen the acquisition cycle of the sensor data for one or more of the air conditioners other than the air conditioner for which the sign of malfunction is detected.

7. A non-transitory computer readable recording medium storing a program for causing a computer to function as:
  a sensor data acquirer to acquire sensor data during an acquisition cycle having an ordinary cycle and a shortened cycle that is shorter than the ordinary cycle, by communication, from each of one or more air conditioners that includes an outdoor unit and one or more indoor units, the sensor data including measurement results of one or more sensors included by the air conditioner, acquiring the sensor data during the acquisition cycle begins in the ordinary cycle; and
  a changer
    to make, when a sign of malfunction is detected in any of the one or more air conditioners, to the air conditioner for which the sign of malfunction is detected, a change of the acquisition cycle of the sensor data to the shortened cycle, and
    to make, when the sign of malfunction is detected in any of the one or more air conditioners, a change to lengthen the acquisition cycle of the sensor data for one or more of the air conditioners other than the air conditioner for which the sign of malfunction is detected.

* * * * *